March 7, 1933. B. M. LEECE ET AL 1,900,719
GENERATOR REGULATION
Filed May 27, 1931
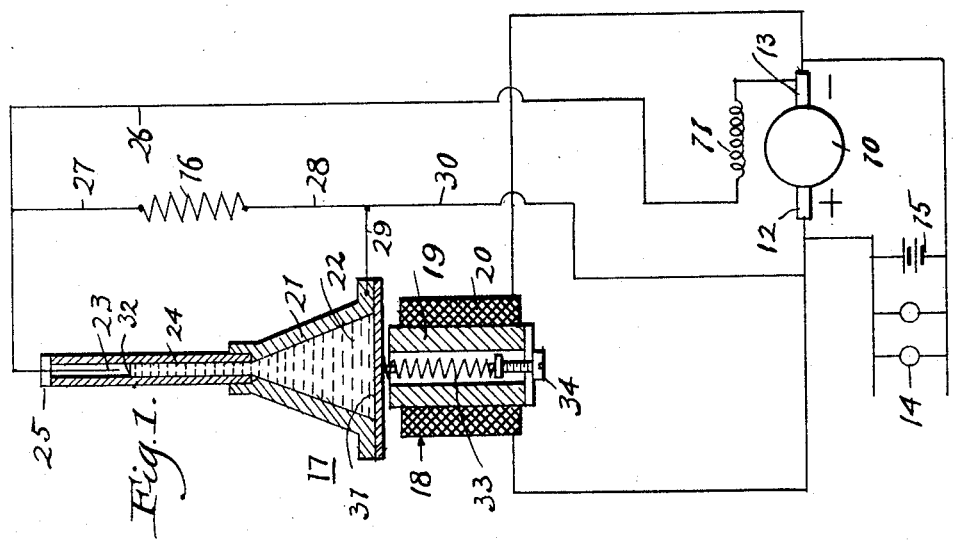
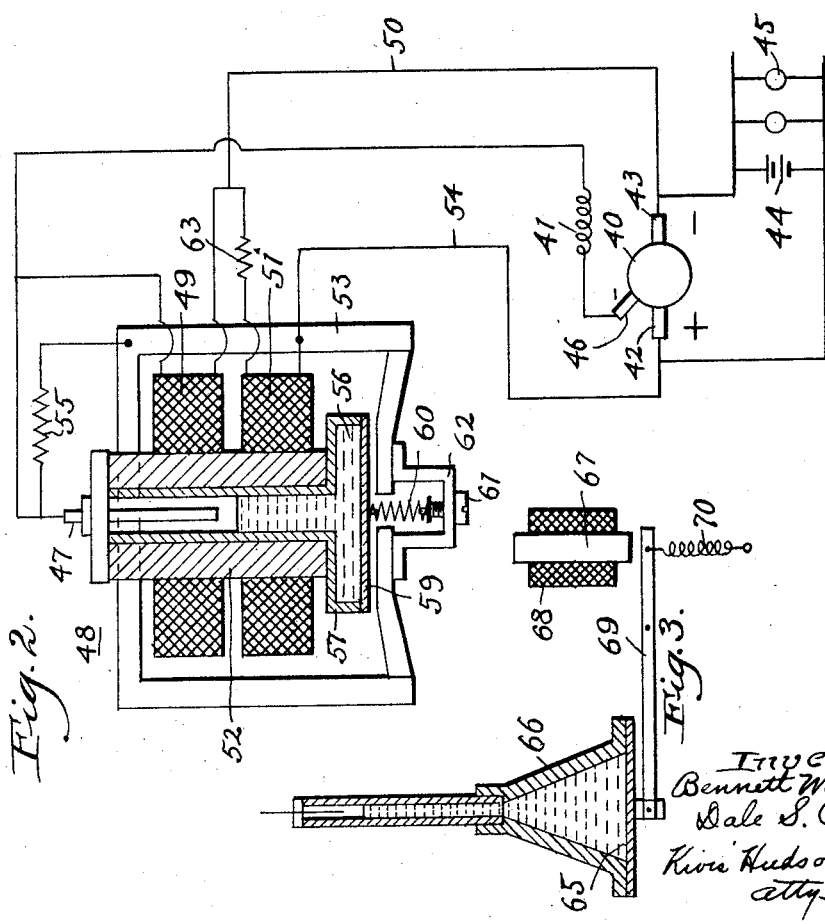

Patented Mar. 7, 1933

1,900,719

UNITED STATES PATENT OFFICE

BENNETT M. LEECE, OF CLEVELAND, AND DALE S. COLE, OF CLEVELAND HEIGHTS, OHIO, ASSIGNORS TO THE LEECE-NEVILLE COMPANY, OF CLEVELAND, OHIO, A CORPORATION OF OHIO

GENERATOR REGULATION

Application filed May 27, 1931. Serial No. 540,396.

This invention relates to generating systems for battery charging, lighting and other purposes, and more particularly to novel means for efficiently regulating the voltage generated in such a system.

An object of this invention is to provide regulating means for a system of the kind referred to, embodying an electromagnet, and cooperating contact elements, one of which is a body of current conducting liquid adapted to be vibrated by the electromagnet.

Another object of this invention is to provide novel regulating means embodying an electromagnet, and a chamber containing current conducting liquid and having a movable wall adapted to form a vibratory armature for the electromagnet.

A further object of this invention is to provide regulating means of the type referred to, wherein the liquid chamber is provided with a passage of reduced cross-section into which the liquid is displaced by the vibration of a diaphragm forming a wall of the chamber.

Still another object of this invention is to provide regulating means of the type referred to, in which the flexible wall of the fluid chamber is initially stressed, and wherein means is provided for varying the initial stress in said wall.

The invention may be further briefly summarized as consisting in certain novel combinations and arrangements of parts hereinafter described and particularly set out in the appended claims.

In the accompanying sheet of drawing;

Figure 1 is a diagrammatic view of a generating system embodying our novel regulating means.

Fig. 2 is a diagrammatic view of another generating system embodying the novel regulating means of our invention and, Fig. 3 is a diagrammatic view showing alternative means for actuating the diaphragm of the liquid chamber.

In the drawing to which detailed reference will presently be made, we have illustrated the preferred forms of the regulating means of our invention and have shown the same embodied in generating systems of a type suitable for battery charging, lighting and other purposes, but it should be understood that our regulating means may assume other forms than those illustrated, and may be embodied in various generating systems.

In Fig. 1 of the drawing we have shown a generating system of the type referred to, embodying a generator 10 having a field winding 11, and brushes 12 and 13 for delivering current to the lamps 14 and for charging the storage battery 15, or other purposes. In general our regulating means comprises a resistance element 16, and an electromagnetic device 17 for intermittently connecting the resistance element in series with the field 11. The intermittent connection of this resistance element into the field circuit alters the resistance of this circuit and consequently varies the ampere turns of the field winding, which, in turn varies the voltage output of the generator, as will be more fully described hereinafter.

The device 17 embodies an electromagnet 18 having a core 19, and a winding 20 which is connected to the brushes 12 and 13 so that the magnetization of the core will vary with changes in the voltage generated. Adjacent the electromagnet 18, we provide a liquid chamber or casing 21 having a body of current-conducting liquid 22 therein. This body of liquid constitutes a movable contact element which cooperates with a stationary electrode 23 for intermittently short-circuiting the resistance 16. The liquid chamber or casing 21 may be of any desired shape or form, but as shown in Fig. 1, is substantially conical in shape having a hollow tubular member 24, of reduced cross-section, communicating therewith adjacent the apex of the cone. The conical casing 21 may be formed of any appropriate material but is preferably made of a suitable metal or alloy. Likewise, the tubular extension 24 may be formed of any suitable material, such as metal or glass.

As shown in Fig. 1, the stationary electrode 23 extends through an insulating cover 25 and is disposed in the reduced passage of the tubular member 24. This electrode is connected with one end of the field winding 11 by the conductor 26, and is also connected with one end of the resistance element 16 by the conductor 27. The body of liquid, which, as stated above, constitutes a movable contact element, is connected with the other end of the resistance element 16 by means of the conductors 28 and 29 and, is also connected with the brush 12 by means of the conductors 29 and 30. This body of liquid is adapted to be displaced into contact with the electrode 23 by movement of a diaphragm 31, which constitutes the bottom wall of the liquid chamber and forms a vibratory armature for the electromagnet 18. This diaphragm may be a disk formed of any suitable magnetic material, which is secured around its periphery to the base of the conical casing 21 so as to afford the desired degree of flexibility. However, it is not necessary that the diaphragm disk itself constitute the armature for the electromagnet, since if desired, the armature may consist of a body of magnetic material which is secured to a non-metallic diaphragm disk. It will be seen from the arrangement thus far described, that since a relatively large area of the diaphragm 31 is in contact with the body of liquid, movement of the diaphragm through a relatively short distance will cause the liquid level to rise or fall through a relatively greater distance within the restricted passage of the tubular member 24. In other words, the liquid displaced into the passage of the member 24 by a slight upward movement of the relatively large area represented by the diaphragm, will cause the liquid surface 32 which is of small area as compared with the diaphragm, to rise through a relatively greater distance and engage the stationary electrode 23.

To provide for an initial stress, or resistance to movement, in the diaphragm 31, so as to afford greater resistance to the magnetic action of the core 19, than would be offered by the inherent resilience of the diaphragm, we provide a spring 33 which may be disposed in a passage extending through the core. As herein shown one end of the spring is in engagement with the diaphragm and its other end is in engagement with an adjusting screw 34. If desired this spring may be omitted, in which case the inherent resilience of the diaphragm would be relied upon to oppose the magnetic action of the core 19. However, the use of this spring is desirable because it results in a more rapid vibration of the diaphragm being obtained, and in combination with the screw 34, affords means for adjusting the initial stress or resistance to movement of the diaphragm, and consequently the rate of vibration of the movable contact element.

The liquid confined in the chamber 21 may be any suitable current-conducting liquid, such as mercury, but is, in all cases, preferably, a liquid having relatively great molecular cohesion, or in other words, a high surface tension characteristic, so that its rise and fall in the relatively small passage of the member 24, will not be retarded by adhesion between the liquid and the wall of the passage. In some instances it may be desirable to evacuate the liquid chamber so as to reduce the pressure upon the surface 32 of the body of liquid and thereby reduce resistance to movement of the liquid upwardly within the passage of the member 24. However, in some instances it may be desirable to maintain fluid pressure within the liquid chamber by the introduction of a suitable gas, particularly when the regulating device is to be employed on movable apparatus, such as a vehicle. The pressure maintained in the liquid chamber tends to prevent excessive and undesirable splashing of the liquid which might occur during movement of the vehicle.

It will be seen that during the operation of the arrangement illustrated in Fig. 1, a decrease in the voltage output of the generator 10 decreases the magnetization of the core 19 of the electromagnet 18, allowing the diaphragm 31 to be moved upwardly by the spring 33. This upward movement of the diaphragm causes some of the body of liquid 22 to be displaced into the tubular member 24 resulting in the liquid surface 32 being raised into contact with the stationary electrode 23. The contact of the liquid with the stationary electrode establishes a circuit through the liquid and the conductor 29, thereby short-circuiting the resistance element 16 out of the field circuit. The decrease in the resistance of the field circuit results in an increase in the ampere-turns of the field winding, which in turn tends to increase the voltage output of the generator. This increase in the generated voltage increases the magnetization of the core 19 and pulls the diaphragm 31 downwardly against the action of the spring 33 permitting the surface of the body of liquid to move out of contact with the stationary electrode 23, thereby inserting the resistance element 16 in series with the field winding 11. The insertion of this additional resistance in the field circuit decreases the ampere-turns of the field winding and results in a decrease in the voltage output of the generator. It will be understood of course that the action of the diaphragm 31 under the influence of the spring 33 and the electromagnet 18 will be a rapid vibration and that the voltage of the generator will thus be maintained substantially constant.

In Fig. 2 of the drawing we have shown another generating system embodying our invention, which includes a generator 40 having a field winding 41 and main brushes 42 and 43 which deliver current for charging the battery 44, operating the lamps 45, or for other purposes. As shown in this figure one end of the field winding is connected to an auxiliary brush 46, and the other end is connected to the stationary electrode 47 of the regulating device 48 and also to one end of a coil 49, which forms one winding of an electromagnet embodied in this device. The other end of the coil 49 is connected to the brush 43 by a conductor 50, and is also connected to one end of a winding 51, which surrounds the core 52 of the electromagnet in addative relation to the winding 49. The other end of the winding 51 is connected to the frame 53 of the electromagnet, and to the brush 42 through the conductor 54. The frame of the electromagnet is also connected to the stationary electrode 47 through a field resistance element 55.

To provide a movable contact element for cooperation with the stationary electrode 47, we provide a body of current-conducting liquid 56 which is confined within a chamber or casing 57. This casing is formed with a tubular portion of reduced cross-section, which extends within the core 52, and in which the stationary electrode 47 is disposed. A flexible diaphragm 59 constitutes the bottom of the liquid chamber, and forms a vibratory armature for the electromagnet. A suitable spring 60 may be provided for initially stressing, or resisting movement of, the diaphragm 59. This spring may be arranged with one end thereof in engagement with the diaphragm and the other end in engagement with an adjusting screw 61 which is carried by the frame element 62.

It will be seen from the arrangement described that the coil 49 of the electromagnet will respond to the voltage output of the generator, causing the diaphragm 59 to be vibrated, as explained in connection with Fig. 1, to thereby intermittently connect the resistance element 55 in series with the field winding. The coil 51 of the electromagnet responds to changes in the operating condition of the generator and acts as a demagnetizing coil in the manner described in detail in United States Patent No. 1,540,698 granted June 2, 1925.

To compensate for temperature changes it may be desirable to provide a resistance element 63 in series with the winding 51. This resistance element may consist of a material having a negative temperature coefficient of resistance, such as the Globar element disclosed in United States Patent No. 1,633,671. The effect of this resistance element is to offset changes occurring in the resistance of the winding 51 due to changes in the temperature of the atmosphere, or changes in the operating temperature of the device itself.

Compensation may also be made for slight temperature changes by increasing the volume of the body of confined current-conducting liquid, so that the lower end of the stationary electrode is normally immersed in the liquid and contact is broken only upon downward movement of the diaphragm by the action of the electromagnet.

In Fig. 3 of the drawing, we have shown alternative means for actuating the diaphragm 65 of a liquid chamber 66, in response to changes in the magnetization of a core 67 of an electromagnet 68. In this arrangement we provide a lever 69, one end of which constitutes the vibratory armature for the electromagnet, and the other end of which is pivotally connected to the diaphragm 65. A spring 70 may be provided for opposing the action of the electromagnet and initially stressing the diaphragm 65. With this arrangement it is not necessary that the liquid chamber be positioned immediately adjacent to the electromagnet as in Figs. 1 and 2 of the drawing, since the diaphragm itself does not constitute the armature for the magnet. Furthermore, in this arrangement the most suitable material may be used for the diaphragm 65 regardless of whether this material is magnetic or non-magnetic.

It will now be readily seen that we have provided efficient generator regulating means in which the contacts will not pit, corrode or change materially during long periods of operation. Moreover, in this form of regulating means the contacts are not likely to require adjustment and are such as cannot be easily tampered with.

While we have illustrated and described the apparatus of our invention in a detailed manner, it will be understood of course that we do not intend to limit ourselves to the precise details of construction and arrangements of parts illustrated and described, but regard our invention as including such changes and modifications as do not involve a departure from the spirit of the invention and the scope of the appended claims.

Having thus described our invention we claim:

1. In a system of the character described the combination of a generator, and a regulator therefor comprising a magnet having a coil energized by said generator, a liquid chamber extending within said coil and having a flexible wall adapted to be vibrated by said magnet, an electrode in said chamber, and a body of current-conducting liquid in said chamber adapted to be displaced into contact with said electrode by the vibration of said wall.

2. The combination with a generator having a field winding, of a regulator for varying the ampere turns of said field winding comprising an electromagnet, a chamber having a part adapted to form a vibratory armature for said electromagnet, an electrode in said chamber, and a body of current-conducting liquid in said chamber adapted to be displaced into contact with said electrode by the vibration of said part.

3. In a system of the character described the combination of a generator, and a regulator therefor comprising a magnet having a coil energized by said generator, a liquid chamber having a movable wall adapted to form a vibratory armature for said magnet, said chamber having a passage of reduced cross-section communicating therewith, an electrode in said passage, and a body of current-conducting liquid in said chamber adapted to be displaced into contact with said electrode by the vibration of said wall.

4. In a system of the character described the combination of a generator, and a regulator therefor comprising a magnet having a coil energized by said generator, a casing of substantially conical shape, a flexible diaphragm closing said casing at the base thereof and adapted to be vibrated by said magnet, an electrode in said casing adjacent the apex thereof, and a body of current-conducting liquid in said casing adapted to be displaced into contact with said electrode by the vibration of said diaphragm.

5. In a system of the character described the combination of a generator, and a regulator therefor comprising a magnet having a coil energized by said generator, a casing of substantially conical shape, said casing having a passage of reduced cross-section communicating therewith substantially at the apex of the cone, a flexible diaphragm closing said casing at the base thereof and adapted to be vibrated by said magnet, an electrode in said passage, and a body of current-conducting liquid in said casing adapted to be displaced into contact with said electrode by the vibration of said diaphragm.

6. In a system of the character described the combination of a generator, and a regulator therefor comprising a magnet having a coil energized by said generator, a liquid chamber having a movable wall adapted to form a vibratory armature for said magnet, said chamber having a passage of reduced cross-section extending into the core of said magnet, an electrode in said passage, and a body of current-conducting liquid in said chamber adapted to be displaced into contact with said electrode by the vibration of said wall.

In testimony whereof, we hereunto affix our signatures.

BENNETT M. LEECE.
DALE S. COLE.